United States Patent
Glain

(10) Patent No.: US 12,534,206 B2
(45) Date of Patent: Jan. 27, 2026

(54) REMOVABLE DEVICE FOR HOLDING AN ISOLATING CURTAIN FOR THE CREATION OF A REST SPACE INSIDE AN AIRCRAFT CABIN

(71) Applicant: Safran Seats, Plaisir (FR)

(72) Inventor: Arthur K. Glain, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/700,954

(22) PCT Filed: Oct. 19, 2022

(86) PCT No.: PCT/EP2022/079084
§ 371 (c)(1),
(2) Date: Apr. 12, 2024

(87) PCT Pub. No.: WO2023/066991
PCT Pub. Date: Apr. 27, 2023

(65) Prior Publication Data
US 2024/0409220 A1   Dec. 12, 2024

(30) Foreign Application Priority Data
Oct. 20, 2021  (FR) ........................................ 2111120

(51) Int. Cl.
*B64D 11/06*    (2006.01)
(52) U.S. Cl.
CPC ................................ *B64D 11/0606* (2014.12)

(58) Field of Classification Search
CPC ............ B64D 11/0606; B64D 11/0023; B64D 11/003; B64D 2011/0076
See application file for complete search history.

(56) References Cited

U.S. PATENT DOCUMENTS 9,027,880 B2    5/2015  Breuer et al.
10,421,546 B2 * 9/2019  Dowty ............... B64D 11/0606
(Continued)

FOREIGN PATENT DOCUMENTS

EP       3643615 A1    4/2020
WO    2019224591 A1   11/2019

OTHER PUBLICATIONS

International Patent Application No. PCT/EP2022/079084, International Preliminary Examination Report/International Preliminary Report on Patentability, dated Apr. 23, 2024.
(Continued)

*Primary Examiner* — Joshua D Huson
*Assistant Examiner* — Shanna Danielle Glover
(74) *Attorney, Agent, or Firm* — Kilpatrick Townsend & Stockton LLP

(57) ABSTRACT

An assembly for an aircraft cabin includes at least one seat unit including a seat and a privacy shell extending at least partially around the seat, a compartment, such as a luggage compartment, at least one isolating curtain added to the compartment, and a removable device for holding the isolating curtain. The removable device being configured to hold the isolating curtain suspended from the compartment, so as to at least partially define a closed rest space around the seat unit and to permit manual detachment of the isolating curtain from the compartment without requiring a tool.

4 Claims, 8 Drawing Sheets

(56) References Cited

U.S. PATENT DOCUMENTS

| | | | |
|---|---|---|---|
| 2010/0219292 A1* | 9/2010 | Saint-Jalmes | B64D 11/0023 244/118.5 |
| 2012/0090796 A1* | 4/2012 | D'Ambrosia | F16B 5/0692 83/821 |
| 2015/0053817 A1 | 2/2015 | Wartena et al. | |
| 2016/0288908 A1* | 10/2016 | Moje | B64D 11/003 |
| 2018/0194471 A1* | 7/2018 | Merrick | B64D 11/0023 |
| 2020/0047641 A1* | 2/2020 | D'Eramo | B60N 2/986 |

OTHER PUBLICATIONS

International Patent Application No. PCT/EP2022/079084, International Search Report and Written Opinion, dated Jan. 30, 2023.

* cited by examiner

[Fig. 1]
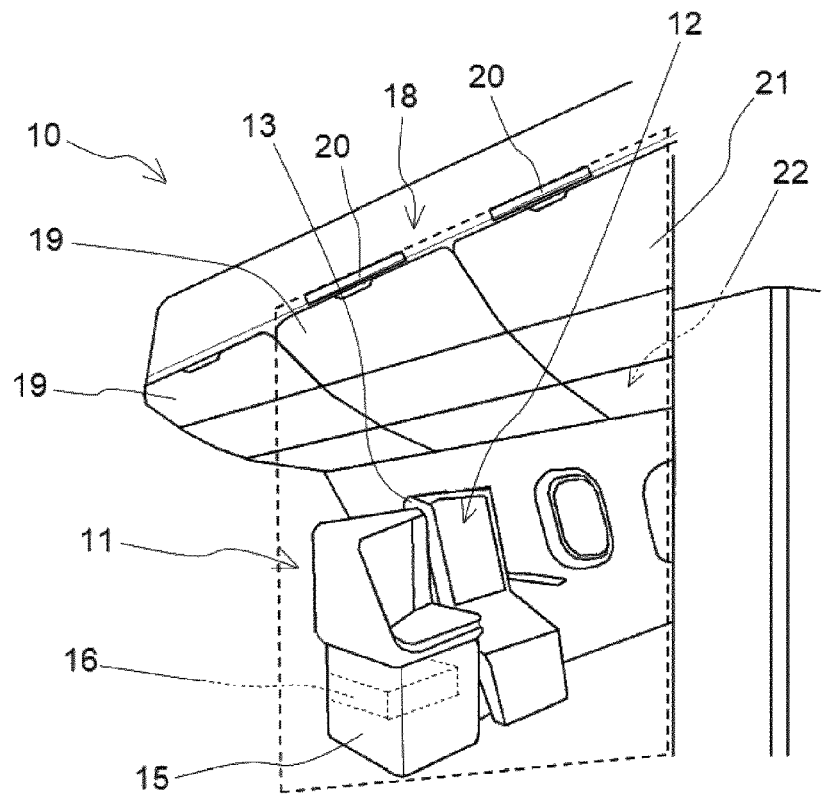
[Fig. 2a]
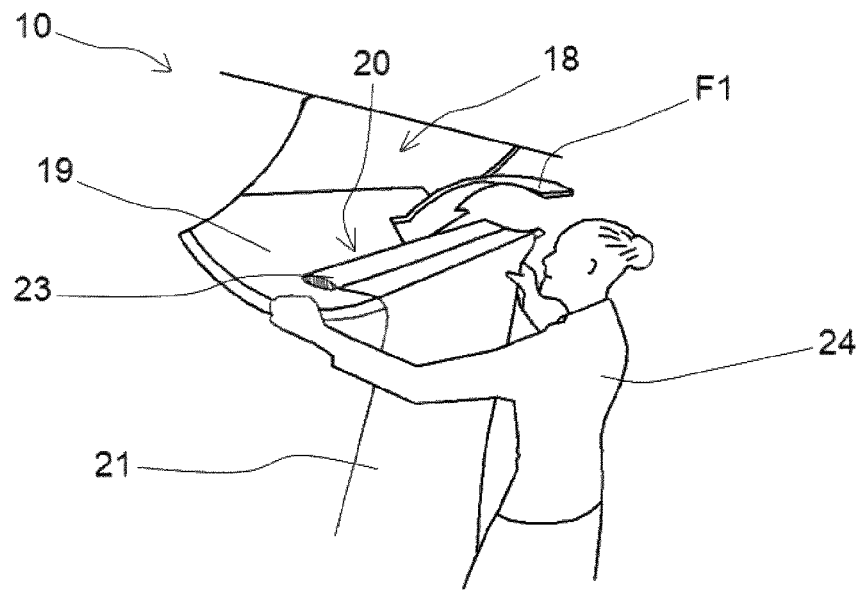

[Fig. 2b]
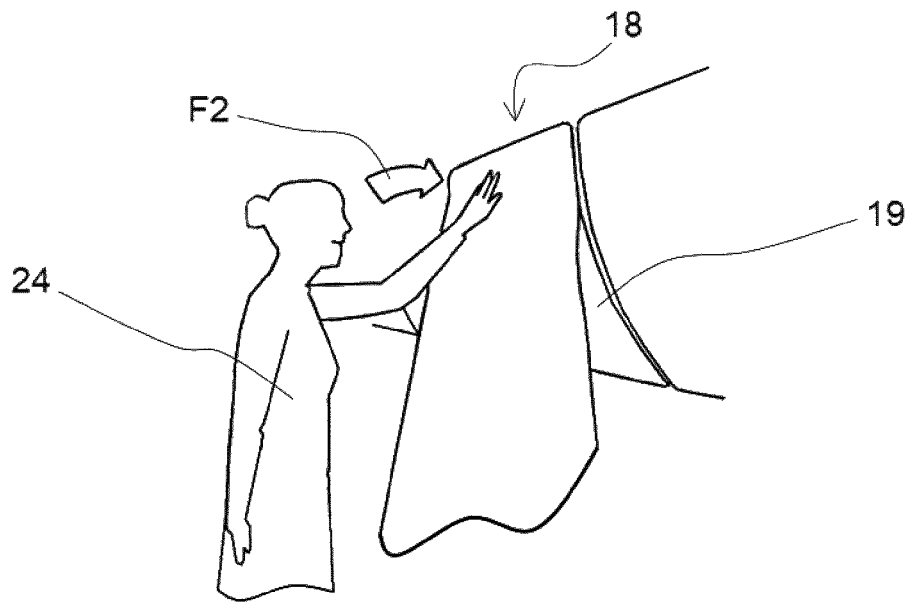
[Fig. 3a]
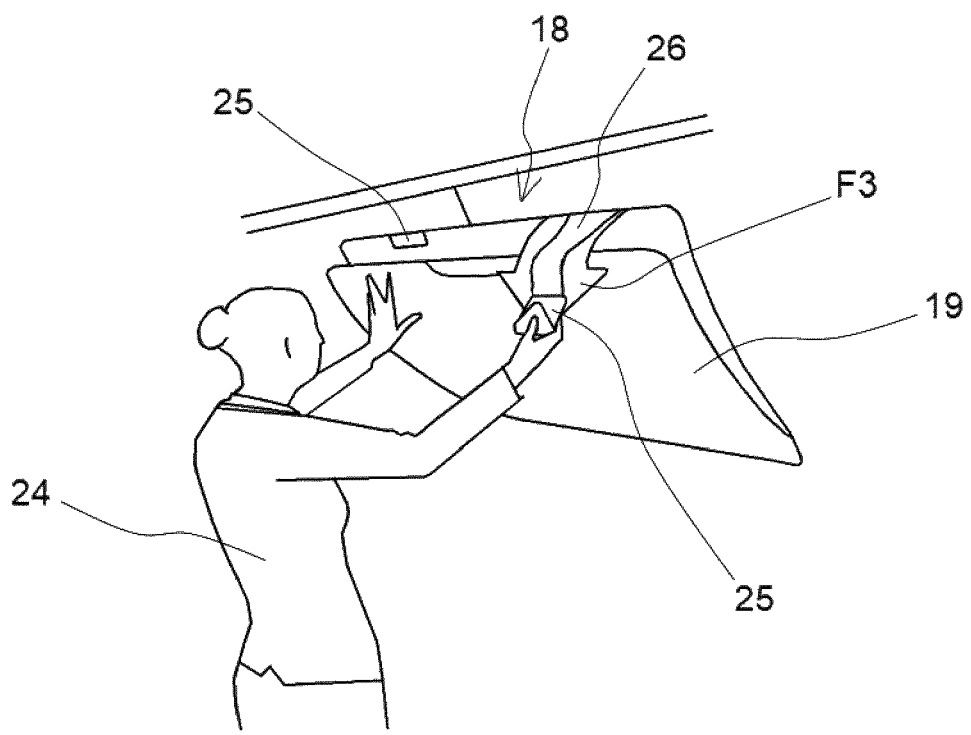

[Fig. 3b]
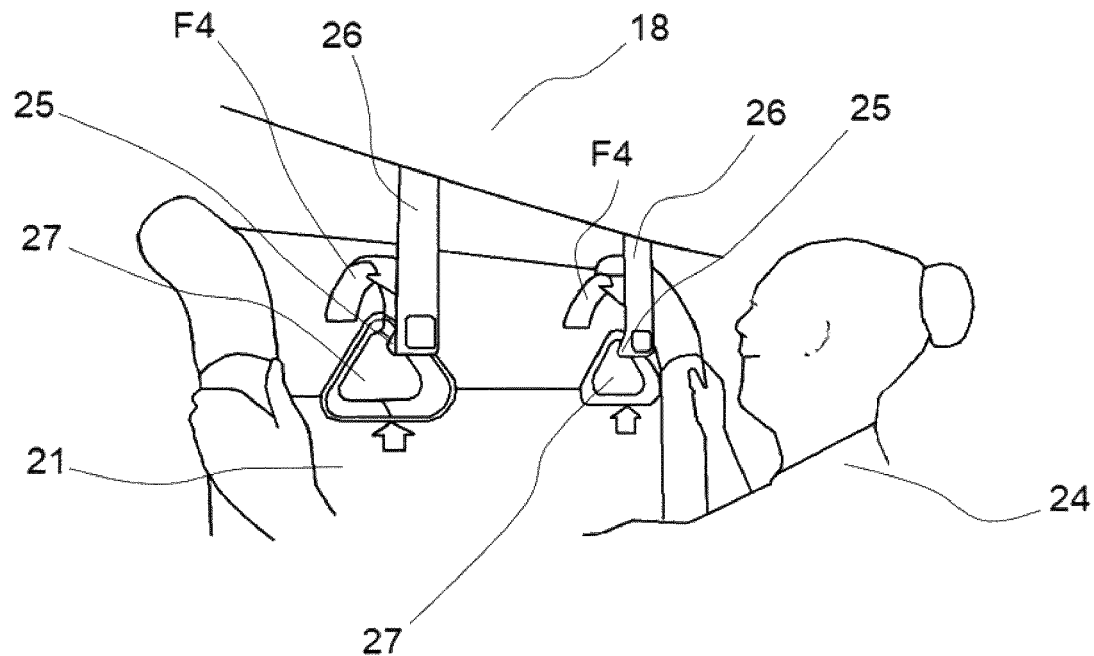
[Fig. 4]
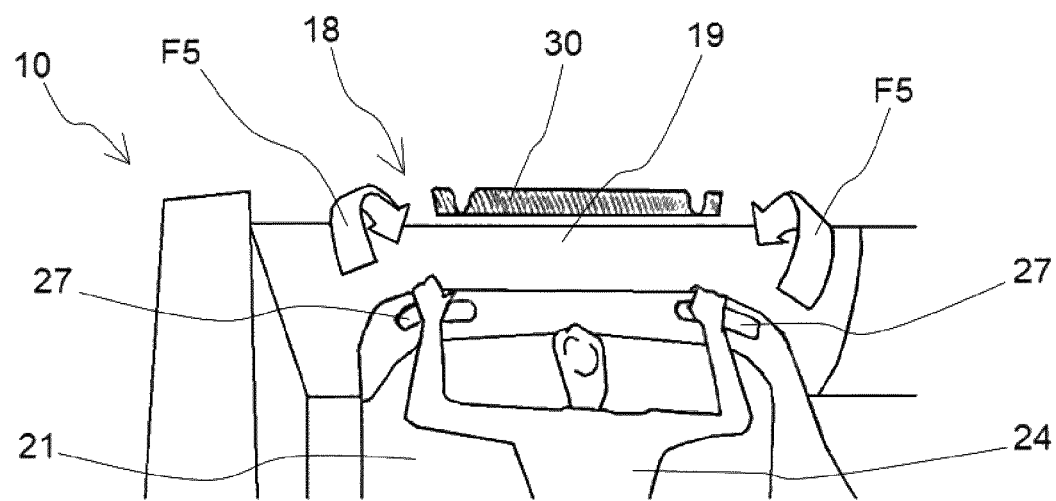

[Fig. 5a]
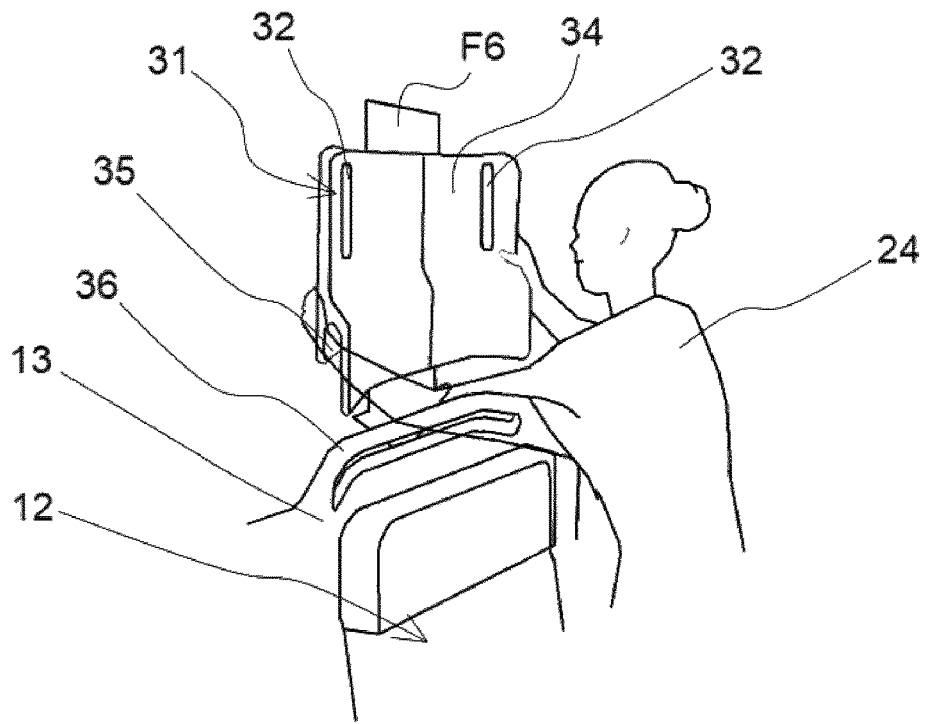
[Fig. 5b]
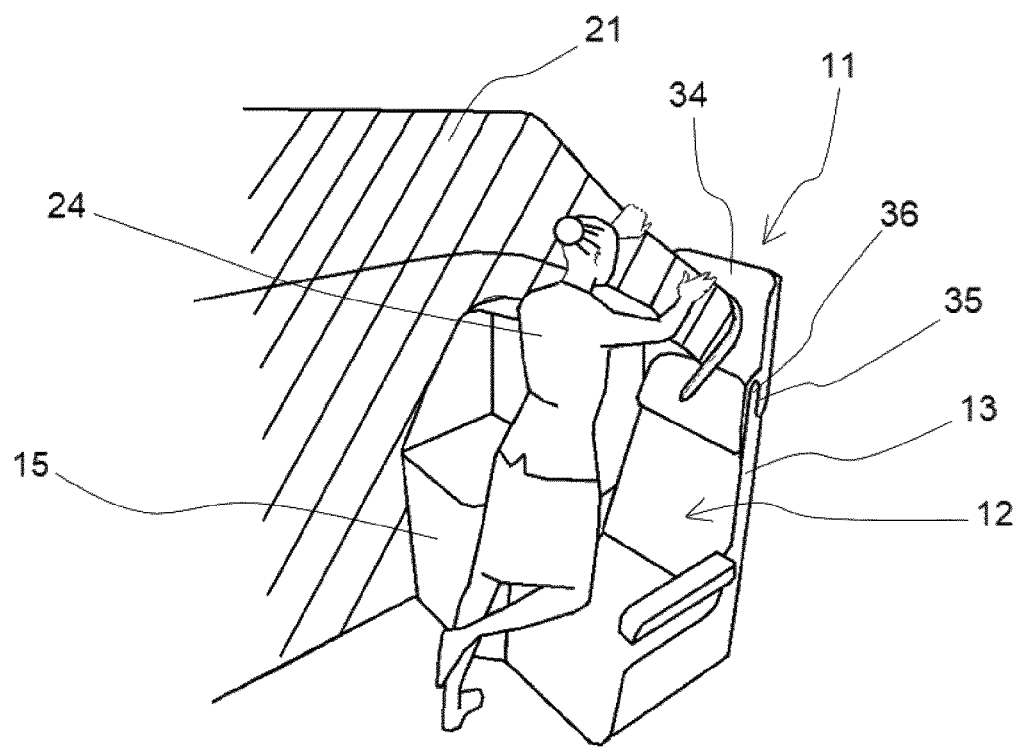

[Fig. 6]
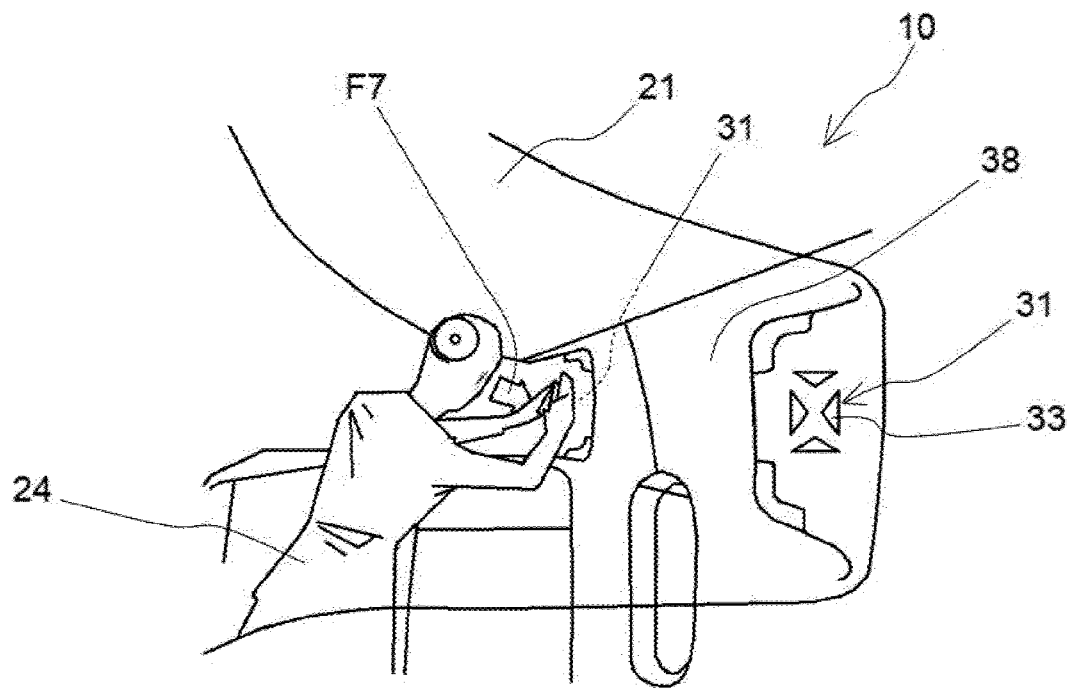
[Fig. 7]
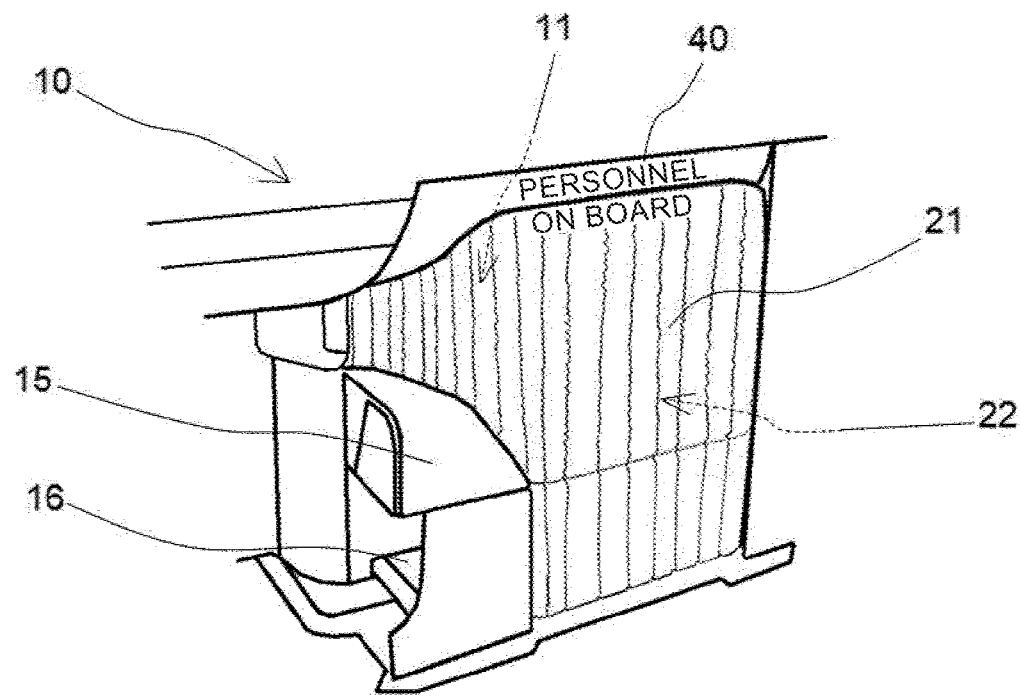

[Fig. 8]
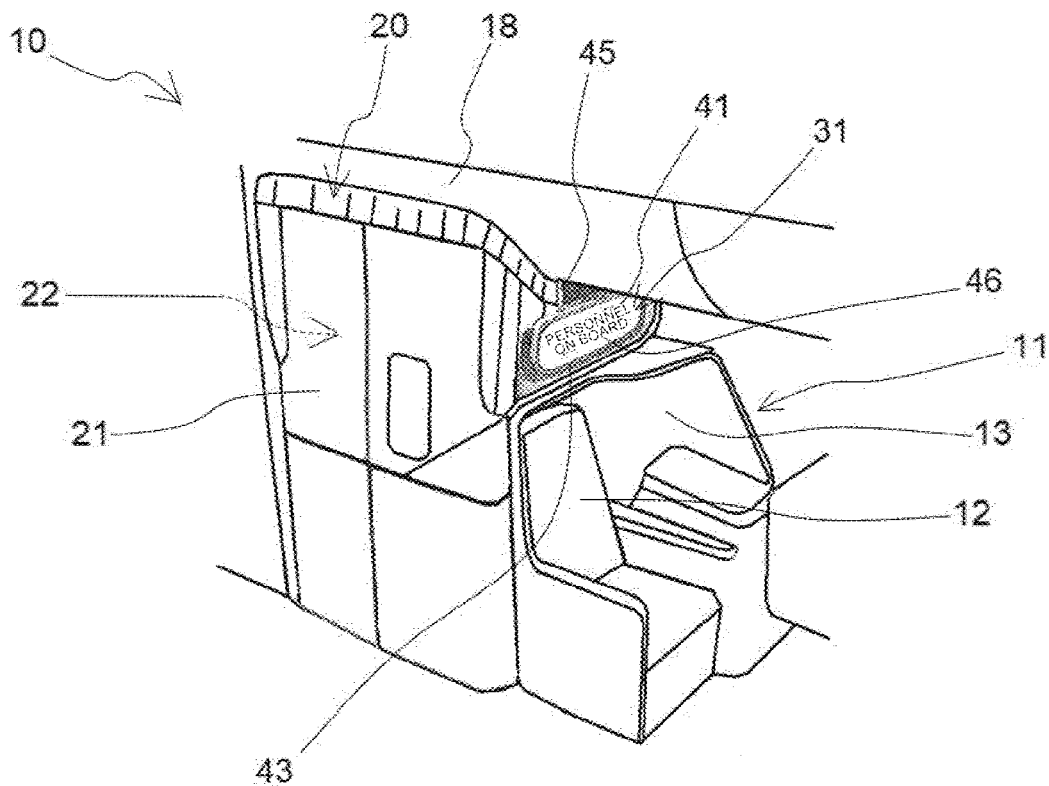
[Fig. 9]
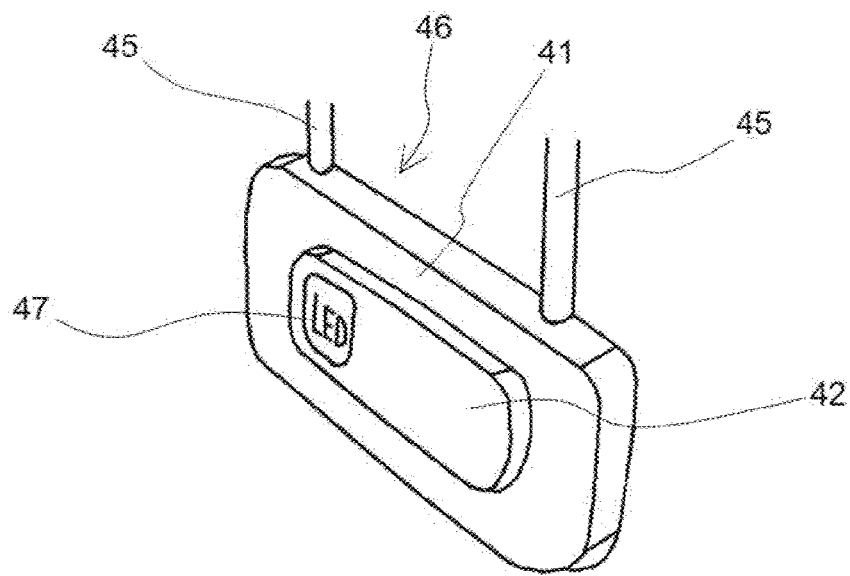

[Fig. 10]
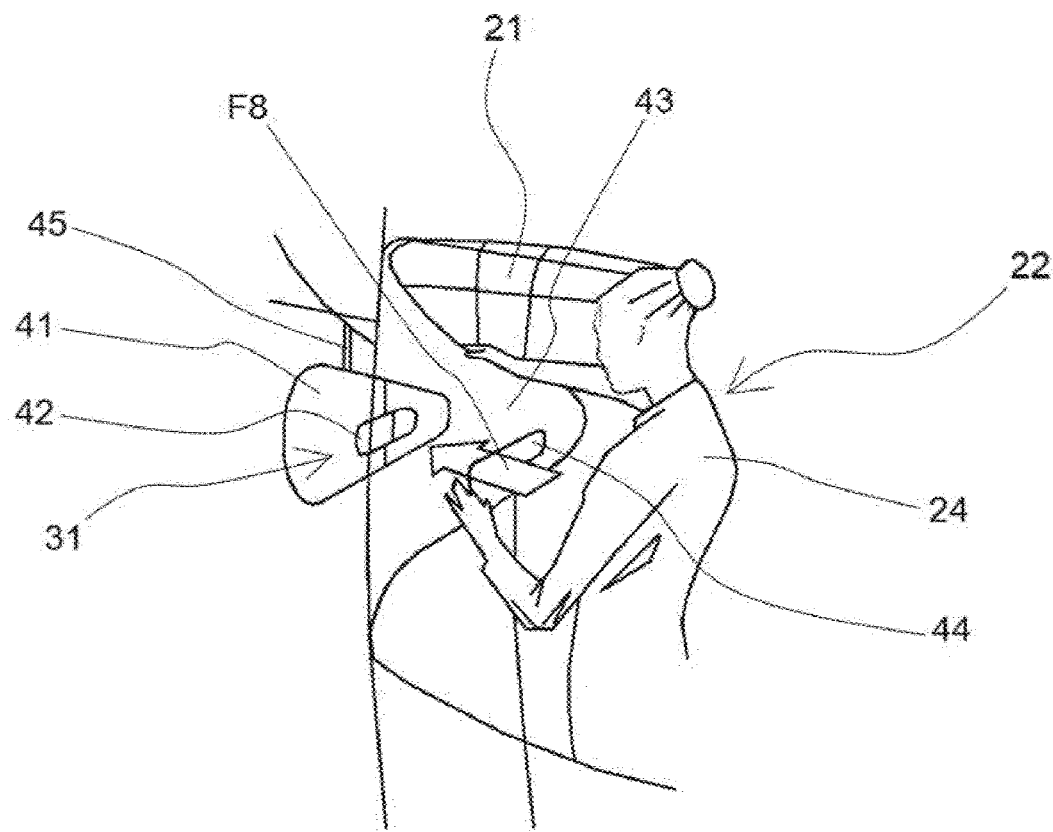
[Fig. 11]
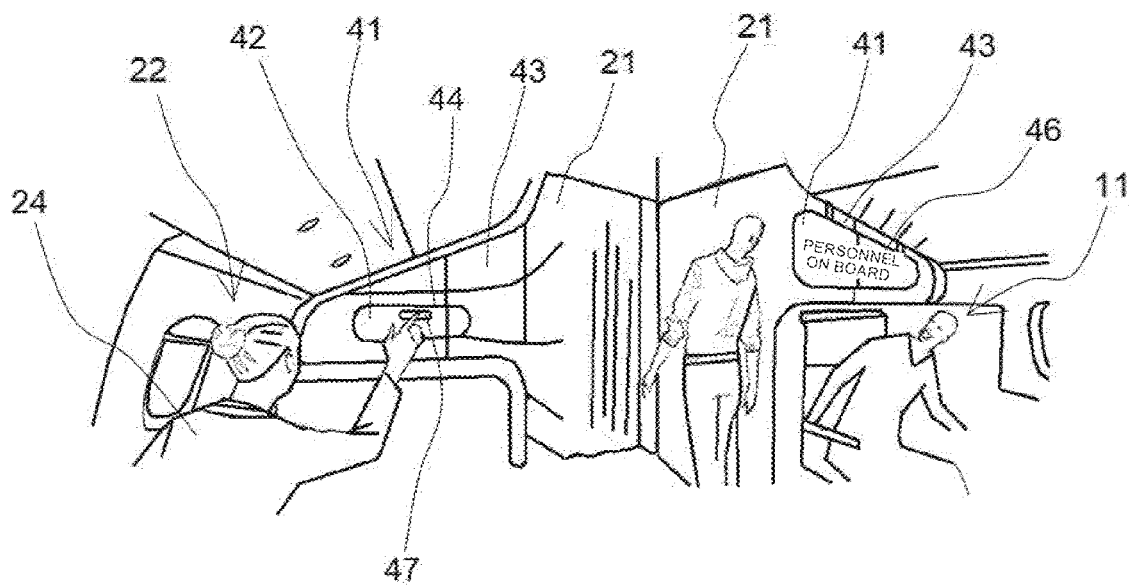

[Fig. 12]
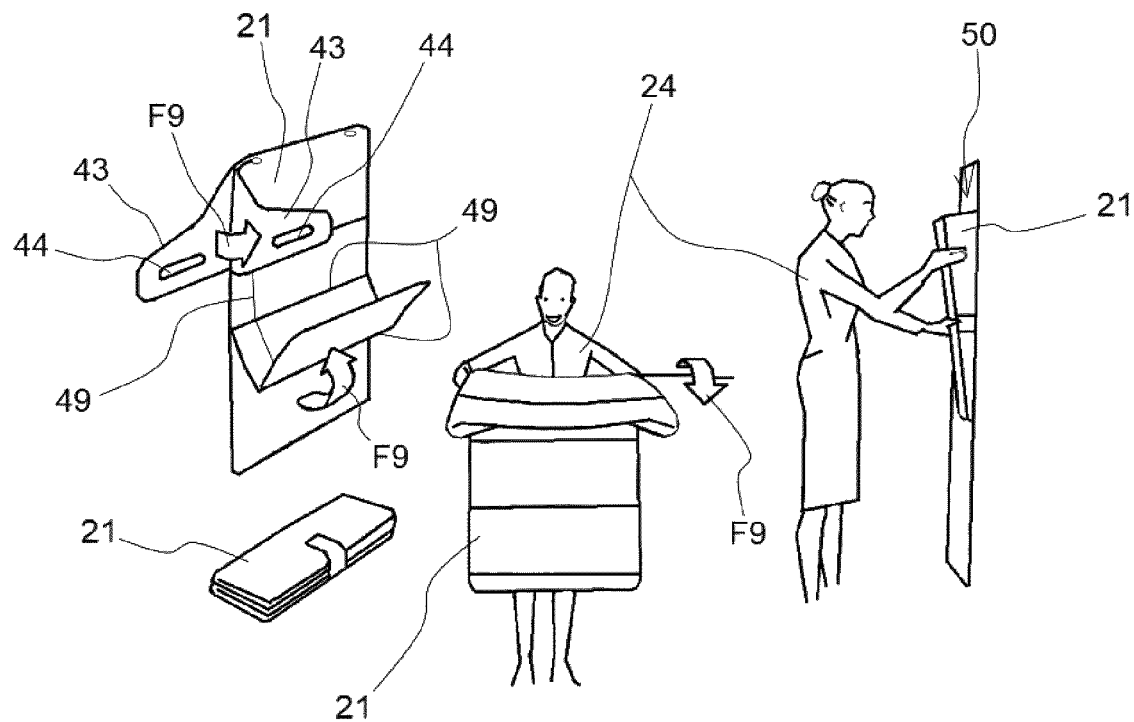

REMOVABLE DEVICE FOR HOLDING AN ISOLATING CURTAIN FOR THE CREATION OF A REST SPACE INSIDE AN AIRCRAFT CABIN

The present invention relates to a removable holding device for an isolating curtain for creating a rest space inside an aircraft cabin, in particular an airplane cabin.

Devices are known for creating a rest space around an airplane seat, in particular a "Business Class" seat, in order to allow the crew members to rest among the passengers within the airplane cabin.

The solutions currently used consist of stretching curtains around a Business class seat. These are a protection from other passengers during sleep phases. These curtains also are a protection from light and lack of privacy with other passengers in order to provide greater comfort and privacy for crew members.

These curtains however pose aesthetic problems as well as integration problems within the aircraft cabin. Indeed, curtains require the installation of bulky and unsightly modules, such as exposed rails which degrade the quality perceived by the passengers in the cabin. Adding external rails can also pose safety issues in the event of a crash.

Furthermore, the usefulness of these curtains is not clearly communicated to passengers. This can lead passengers to question their function in the cabin. In particular, passengers may wonder if these curtains are used to hide a broken seat or form a medical tent. The curiosity of certain passengers who may be tempted to look behind the curtains is likely to disturb the rest of the crew members. This can result in embarrassing situations for both passengers and crew members.

Thus, known curtain systems do not allow crew members to sleep comfortably while being isolated from other passengers within the cabin. These systems also do not meet the qualitative criteria in terms of finish and aesthetics for a Business class cabin.

The invention aims to effectively remedy the aforementioned drawbacks by proposing an aircraft cabin comprising:
- at least one seat unit comprising a seat and a privacy shell extending at least partly around the seat,
- a compartment, such as a luggage compartment, in particular located in the upper part of said cabin,
- at least one isolating curtain attached to the compartment, and
- a removable holding device for the isolating curtain configured so as to hold the isolating curtain in a suspended state from the compartment so as to delimit at least partly an enclosed rest space around the seat unit and to allow manual separation of the isolating curtain from the compartment without tool assistance, especially when a crew member wants to store the isolating curtain.

The invention thus allows the isolating curtain to be integrated harmoniously into an airplane cabin without degrading the aesthetic appearance or the perceived quality of a business class type cabin. Indeed, the invention does not require the addition of bulky and visually unsightly modules in the cabin, such as the installation of exposed rails. In addition, when the solution is not deployed, the isolating curtain can be discreetly stored in the compartment without disturbing passengers. The invention also makes it possible to improve the separation between the rest space for the crew members and the rest of the cabin. Rest conditions for the crew members are therefore also improved. The invention is also economical in nature, in that it is simple to produce and requires almost no modification to the cabin.

According to one embodiment of the invention, the removable holding device for the isolating curtain comprises a weighted bar extending at least partly along an upper edge of the isolating curtain, said weighted bar being intended to be positioned inside an internal volume of the compartment delimited by a drawer, so that when the drawer is in the closed position, the isolating curtain is pinched between the drawer and a fixed part of the luggage compartment so as to be kept suspended from the compartment.

According to one embodiment of the invention, the removable holding device for the isolating curtain comprises at least one hook for cooperating with a corresponding hooking zone of the isolating curtain.

According to one embodiment of the invention, the removable holding device for the isolating curtain comprises a plurality of hooks whose colors correspond to colors of corresponding hooking areas of the isolating curtain.

According to one embodiment of the invention, the hook is movable between a stored position in which the hook is entirely disposed inside an internal volume in the compartment, and a deployed position in which the hook protrudes at least partly from the compartment to allow the hanging of the isolating curtain to said hook.

According to one embodiment of the invention, the removable holding device for the isolating curtain comprises a hook device permanently placed inside the luggage compartment.

According to one embodiment of the invention, at least one secondary removable holding device for the isolating curtain is provided for positioning and fixing a portion of the isolating curtain below the compartment.

According to one embodiment of the invention, the secondary removable holding device is provided on an attached extension for cooperating with the privacy shell.

According to one embodiment of the invention, the secondary removable holding device is provided on a wall of the aircraft cabin.

According to one embodiment of the invention, the secondary removable holding device includes magnets for cooperating with metallic or magnetic elements in the isolating curtain.

According to one embodiment of the invention, the secondary removable holding device includes self-gripping fasteners for cooperating with self-gripping fasteners of corresponding shape in the isolating curtain.

According to one embodiment of the invention, the isolating curtain comprises a marking in the form of a text and/or a symbol indicating that the isolating curtain delimits an enclosed rest space for crew members.

According to one embodiment of the invention, the isolating curtain is customizable in the colors of an airline.

According to one embodiment of the invention, the isolating curtain is made in a flexible material.

According to one embodiment of the invention, the isolating curtain is made in a uniformly pleated textile material.

According to one embodiment of the invention, the secondary removable holding device comprises a cabin separator provided with at least one means of attachment to at least one side flap of the isolating curtain.

According to one embodiment of the invention, the cabin separator is fixed under the compartment.

According to one embodiment of the invention, the cabin separator can be equipped with a light display system, notably with light emitting diodes (LED).

According to one embodiment of the invention, the cabin separator comprises an internal face facing the interior of the enclosed space and provided with a switch for activating the light display system.

The invention also relates to an aircraft cabin comprising the assembly as defined previously.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

FIG. 1 is a perspective view of part of a cabin aircraft in which an attached insulating curtain according to the present invention is intended to be deployed to create an enclosed rest space;

FIGS. 2a and 2b illustrate the implementation of an isolating curtain according to the invention provided with a weighted bar to be placed inside an internal volume of a luggage compartment for the creation of an enclosed rest space;

FIGS. 3a and 3b illustrate the deployment of movable hooks inside the luggage compartment for installing an isolating curtain according to the invention;

FIG. 4 illustrates the installation of an isolating curtain according to the invention onto a fixed hook device inside a luggage compartment;

FIG. 5a shows an attached extension according to the invention equipped with a secondary removable holding device for the isolating curtain;

FIG. 5b illustrates the installation of an isolating curtain on the attached extension in FIG. 5a;

FIG. 6 illustrates the installation of an isolating curtain according to the invention onto a secondary removable holding device provided on a wall of the aircraft cabin;

FIG. 7 is a perspective view of a closed rest space created after the installation of an isolating curtain according to the present invention;

FIG. 8 is a perspective view of an embodiment in which the isolating curtain is hold on the one hand at the level of the luggage compartment and on the other hand below at the level of a cabin separator;

FIG. 9 is a perspective view of a cabin separator provided with a means of hanging on an insulating curtain;

FIG. 10 is a perspective view illustrating a crew member fixing an isolating curtain to a cabin separator;

FIG. 11 is a view illustrating on one side the actuation of a switch by a crew member and on the other hand the light display of the cabin separator generated by this actuation of the switch;

FIG. 12 illustrates the different steps of folding and storing an isolating curtain according to the present invention.

It should be noted that in the figures the structural elements and/or functionalities common to the different embodiments may have the same references. Thus, unless otherwise stated, such elements have identical structural, dimensional and material properties.

FIG. 1 shows an airplane cabin 10 comprising a plurality of seat units 11, for example of the business class type. Conventionally, the aircraft cabin has several rows of seat units 11 one behind the other. However, only one seat unit 11 has been shown in the figure in order to facilitate understanding of the invention. A seat unit 11 comprises a seat 12 and a privacy shell 13 extending at least partly around the seat 12 so as to isolate the passenger from the external environment.

The seat 12 can offer a passenger different comfort positions, from a "seating" position to a "bed" position, in which the seat 12 defines a substantially horizontal sleeping surface so that the passenger can lie down. Intermediate comfort positions are also offered, such as the "relax" position in which a back of the seat 12 is strongly inclined. Generally, these intermediate positions are obtained by the inclination of the pivoting backrest around a horizontal axis and perpendicular to an axis of extension of the seat 12. The passenger can remain on the seat 12 during transitions between the different positions.

The seat unit 11 may also include a side console 15 having an upper face on which the passenger can place objects. The side console 15 may be provided with a foot housing 16, also visible in FIG. 7, for receiving the feet of a passenger of a corresponding rear seat, in particular when the rear seat is in the "bed" position. Thus, the opening of the leg housing 16 is directed towards the seat 12 immediately behind the console of the seat unit 11.

Furthermore, a compartment 18, such as a luggage compartment, is located in the upper part of the aircraft cabin 10. The luggage compartment 18 may include a drawer 19 movable between an open position allowing the passenger to access the internal volume in the compartment 18 in order to be able to place objects and a closed position in which the drawer 19 closes the internal volume in the compartment 18 in order to prevent objects from falling in flight.

A removable holding device 20 for an isolating curtain 21 is used to create a closed space 22 around the seat unit. The isolating curtain 21 is distinct from the luggage compartment 18.

The removable holding device 20 is configured so as to hold the isolating curtain 21 in a suspended state from the compartment so as to delimit at least in part a closed rest space 22 around the seat unit 11, as shown in FIG. 7. In the suspended state, the isolating curtain 21 preferably extends vertically from the compartment 18.

The removable holding device 20 is also configured so to allow manual separation of the isolating curtain 21 from the compartment 18 without the aid of a tool when a crew member 24 wishes to store the isolating curtain 21. Once uninstalled, the isolating curtain 21 can be stored inside a dedicated space, in particular inside the internal space of the luggage compartment 18.

In the embodiment in FIGS. 2a and 2b, the removable holding device 20 for the isolating curtain 21 comprises a weighted bar 23 extending at least partly along an upper edge of the isolating curtain 21. The weighted bar 23 could for example be made of a rigid metallic or plastic material.

The weighted bar 23 can be placed by a crew member 24 inside an internal volume in the compartment 18 delimited at least partly by the drawer 19 in the open position (see arrow F1). The crew member 24 can then close the drawer 19 by making a movement towards the compartment 18 according to the arrow F2.

Once the drawer 19 is in the closed position, the isolating curtain 21 is then pinched between the drawer 19 and a fixed part of the luggage compartment 18 so as to be hold suspended from the compartment 18. Such a holding device has the advantage of not requiring the use of specific dedicated fixing means which should have been previously installed in the luggage compartment 18.

In the embodiment in FIGS. 3a and 3b, the removable holding device 20 for the isolating curtain 21 comprises at least one hook 25 movable between a stored position in which the hook 25 is entirely placed inside an internal volume in the compartment 18 so as not to disturb a visual aspect of the aircraft cabin 10 and a deployed position in which the hook 25 protrudes at least partly from the compartment 18 so as to allow the insulating curtain 21 to be attached to said hook 25.

For this purpose, the hook 25 can be connected to one end of a strap 26 which is fixed by its other end inside the luggage compartment 18. When the hook 25 is in the stored position, the hook 25 and the strap 26 are arranged inside the luggage compartment 18. When the hook 25 is in the deployed position, the strap 26 can extend between the closed drawer 19 and a fixed portion of the compartment 18. In order to move a hook 25 from the stored position to the deployed position, a crew member 24 can pull it according to the arrow F3. A reel can be used in combination with the strap 26 to automatically return the hook 25 to the stored position when the isolating curtain 21 is removed.

In the example shown, two hooks 25 from the luggage compartment 18 are provided for cooperating with hooking zones 27 on the isolating curtain 21. In FIG. 3b, the crew member 24 causes the hooking zones 27 to cooperate with the hooks 25 via a movement of the curtain 21 according to the arrows F4. The hooking zones 27 may in particular consist of through openings allowing the passage of a corresponding hook 25. A hook 25 may for example have a L-shape, a U-shape, or any other shape adapted to the application allowing the isolating curtain 21 to be suspended. Alternatively, the hook 25 may take the form of a snap hook, that is to say a ring equipped with a manual rapid opening system. Of course, it is possible to provide any number of hooks 25 to ensure the attachment of the isolating curtain 21.

The hooks 25 may have colors corresponding to the colors of the corresponding hooking zones 27 on the isolating curtain 21. This makes it easier to install the isolating curtain 21 by making it more intuitive.

In the embodiment in FIG. 4, the removable holding device 20 comprises a hook device 30 permanently placed inside the luggage compartment 18. The device 30 may include fixed hooks inside the luggage compartment 18. A crew member 24 can thus cause the hooking zones 27 of the isolating curtain 21 to cooperate with end hooks of the device 30 by a flap movement of the isolating curtain 21 according to the arrows F5. This hook device 30 can be accessible when the drawer 19 of the luggage compartment 18 is in the open position.

As previously, the hooks of the device 30 may include different colors to facilitate their matching with hooking zones 27 on the isolating curtain 21.

Furthermore, as illustrated in FIGS. 5a, 5b, and 6, it is preferably provided at least one secondary removable holding device 31 for the isolating curtain 21. This secondary removable holding device 31 is intended to position and fix a portion of the isolating curtain 21 below the compartment 18, in particular at the level of the seat unit 11 and/or a wall in the aircraft cabin 10 and/or a cabin separator 41 (see FIG. 8). Thus, in order to optimize its holding, the isolating curtain 21 is hung on the one hand at the level of the luggage compartment 18 and on the other hand in an area below the luggage compartment 18 at the level of the seat unit 11 and/or the fuselage and/or the cabin separator 41.

The secondary removable holding device 31 may include magnets 32 for cooperating with metallic or magnetic elements in the isolating curtain 21 (see FIG. 5a). Alternatively, the secondary removable holding device 31 may include self-gripping fasteners 33 for cooperating with self-gripping fasteners of corresponding shape in the isolating curtain 21 (see FIG. 6). The self-gripping fasteners 33 are constituted for example by strips of fabric provided with a plurality of loops or hooks of complementary shapes. The strips used could for example be Velcro type strips (registered trademark).

In the embodiment in FIGS. 5a and 5b, the secondary removable support holding device 31 is provided on an attached extension 34 for cooperating with the privacy shell 13 of the seat unit 11, in particular an upper edge of the privacy shell 13.

For this purpose, the attached extension 34 may include a groove 35 that a crew member 24 can cause to cooperate with a portion of an upper edge 36 of the shell 13. For this purpose, as can be seen in FIG. 5a, the attached extension 34 can be placed on the seat 12 by a simple vertical movement according to the arrow F6 so that the upper edge 36 of the privacy shell 13 engages into the groove 35 in the lower part of the attached extension 34.

Once the extension 34 has been put in place, a crew member 24 will be able to fix a portion of the isolating curtain 21 on the face of the attached extension 34 including the holding device for the isolating curtain 21, as shown in FIG. 5b. The face of the attached extension 34 carrying the device 21 extends above the privacy shell 13. The attached extension 34 may include magnets 32 or self-gripping fasteners 33.

In the embodiment in FIG. 6, the secondary removable holding device 31 is provided on a wall 38 in the aircraft cabin 10. The crew member 24 can thus temporarily fix the isolating curtain 21 by pressing it against the wall 38 in the aircraft cabin 10 according to the arrow F7. Such a solution however has the disadvantage of presenting a visual impact that is always present in the aircraft cabin 10 when the isolating curtain 21 is not deployed.

The isolating curtain 21 is preferably made of a flexible material, in particular a textile material. Preferably, the curtain 21 is made of a blackout material. The textile material can be uniformly pleated in order to minimize the unsightly folds of the curtain 21 due to storage. If necessary, the curtain 21 could be made from a padded material. Such a configuration makes it possible to better isolate from noise and light and thus improve the comfort of the crew members. Alternatively, the curtain 21 could be made of leather or imitation leather.

As illustrated in FIG. 7, the curtain 21 may include a marking 40 in the form of a text and/or a symbol indicating that the curtain 21 delimits a closed rest space 22 for crew members. This helps clarify its usefulness to passengers.

The curtain 21 is also customizable to the colors of the airline company.

In order to install the isolating curtain 21, it is initially hung at the level of the luggage compartment 18. For this purpose, the crew member 24 can place the weighted bar 23 inside the luggage compartment 18 before closing the drawer 19 so as to hold it in position. In another embodiment, the fixed or mobile hooks 25 of the luggage compartment 18 may use for cooperating with hooking zones 27 on the isolating curtain 21.

Then, the crew member 24 fixes the sides and/or a lower part of the isolating curtain 21 onto the attached extension 34 and/or onto the wall 38 in the aircraft cabin 10 via the secondary holding device 31.

In order to dismantle the isolating curtain 21, the crew member 24 can pull on the isolating curtain 21 in order to separate it from the secondary holding device 31. She/He can then remove curtain 21 the isolating from the luggage compartment 18 by unhooking the hooking zones 27 from the fixed or movable hooks 25, or by removing the weighted bar 23 from the luggage compartment 18 after opening the drawer 19. The isolating curtain 21 can then be folded for storage.

When the curtain 21 is in the stored state, the latter as well as the secondary holding device 31 are preferably located completely inside the internal volume in the compartment 18. There is then no visible modification within the aircraft cabin 10, so that the invention does not affect the general aesthetic appearance of the aircraft cabin 10. In addition, no external element, such as a rail, is likely to generate safety problems during a crash.

In the embodiment in FIG. 8, the secondary removable holding device 31 includes a cabin separator 41. As can be seen in FIGS. 9 and 10, the cabin separator 41 is provided with at least one means of attachment 42 to at least one side flap 43 of the isolating curtain 21. The cabin separator 41 is fixed under the luggage compartment 18. The cabin separator 41 can be fixed to the luggage compartment 18 by means of fixing arms 45. The cabin separator 42 extends transversely between the space for crew members and an adjacent seat unit 11. The means of hanging 42 may include a projecting portion to be inserted inside an opening 44 in the flap 43 of the isolating curtain 21, as shown in FIG. 10. Alternatively, the means of hooking 42 includes self-gripping fasteners or a magnet system.

Thus, from inside the closed space 22 created by the isolating curtain 21, the crew member 24 will be able to fix, according to the arrow F8, the side flap(s) 43 on the cabin separator 41 The flaps 43 are stronger and wider than the rest of the isolating curtain 21 in order to allow good support at the level of the cabin separator 41. The side flaps 43 extend perpendicular to the plane which the majority of the isolating curtain 21 extends when the latter is put in place. Additions of padded textiles along the edges could make it possible to limit light and sound incursions by filling the space gaps between the isolating curtain 21, the seat, and the walls in the aircraft cabin 10.

As can be seen in FIG. 11, in order to clarify the usefulness of such structure within a business class type cabin, the cabin separator 41 may be equipped with a light display system 46, in particular with light emitting diodes (LED).

Once the isolating curtain 21 is installed, a crew member 24 can press a switch 47 from inside the closed space 22 delimited by the isolating curtain 21 in order to activate the light display. A text mentioning "Crew at rest" could, for example, be displayed to indicate the usefulness of the structure to passengers. Thus, the cabin separator 41 has an internal face facing the interior of the closed space 2 provided with the switch 47 for activating the light display system 46 as well as the hooking means 42; and an external face facing the outside of the closed space 22 provided with light emitting diodes.

As illustrated in FIG. 12, in order to ensure careful storage and avoid creases in the curtain 21, heat-sealed seams 49 constituting folding guides are made in the padded textile of the curtain. A crew member 24 will be able to intuitively fold the isolating curtain 21 following these folding guides 49 according to the folding arrows F9. The folded isolating curtain 21 can then be stored inside a dedicated storage space 50.

For the sake of discretion and privacy, this curtain system is preferably placed at the end of the row at the rear of the aircraft cabin 10.

Of course, the different characteristics, variants and/or forms of embodiment of the present invention can be associated with each other in various combinations to the extent that they are not incompatible with one another or exclusive from one another.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. An assembly for an aircraft cabin comprising:
   at least one seat unit comprising a seat and a privacy shell extending at least partly around the seat,
   a luggage compartment comprising a drawer,
   at least one isolating curtain, wherein the isolating curtain is distinct from the luggage compartment, and
   a removable holding device for the isolating curtain configured to maintain the isolating curtain in a suspended state from the luggage compartment so as to delimit at least partly a closed rest space around the seat unit and to allow manual separation of the isolating curtain from the luggage compartment without tool assistance, and wherein the isolating curtain is configured to be stored inside a dedicated space when removed, the dedicated space being inside an internal space of the luggage compartment,
   wherein the removable holding device for the isolating curtain comprises a weighted bar extending at least in part along an upper edge of the isolating curtain, the isolating curtain being fixed in translation relative to the weighted bar, said weighted bar configured to be positioned inside an internal volume in the luggage compartment delimited by the drawer, so that when the drawer is in a closed position the isolating curtain is pinched between the drawer and a fixed part of the luggage compartment held suspended from the luggage compartment.

2. The assembly according to claim 1, wherein at least one secondary removable holding device for the isolating curtain is provided for positioning and fixing a portion of the isolating curtain below the luggage compartment.

3. The assembly according to claim 2, wherein the isolating curtain comprises at least one side flap, and
   wherein the secondary removable holding device comprises a cabin separator provided with at least one attachment means to the at least one side flap of the isolating curtain.

4. The assembly according to claim 3, wherein the cabin separator is equipped with a light display system, the light display system comprising light emitting diodes (LED).

* * * * *